(12) United States Patent
Ait-Haddou et al.

(10) Patent No.: US 9,643,130 B2
(45) Date of Patent: May 9, 2017

(54) HYDROPHILICALLY MODIFIED FLUORINATED MEMBRANE (IV)

(71) Applicant: PALL CORPORATION, Port Washington, NY (US)

(72) Inventors: Hassan Ait-Haddou, Melville, NY (US); Khaled Abdel-Hakim Helmy Aamer, Port Washington, NY (US); Marcin Stasiak, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 247 days.

(21) Appl. No.: 14/675,585

(22) Filed: Mar. 31, 2015

(65) Prior Publication Data

US 2016/0288062 A1    Oct. 6, 2016

(51) Int. Cl.
*B01D 71/44* (2006.01)
*B01D 71/32* (2006.01)
(Continued)

(52) U.S. Cl.
CPC ......... *B01D 71/44* (2013.01); *B01D 67/0006* (2013.01); *B01D 67/0088* (2013.01);
(Continued)

(58) Field of Classification Search
None
See application file for complete search history.

(56) References Cited

U.S. PATENT DOCUMENTS 3,417,035 A   12/1968  Elmer et al.
3,483,141 A   12/1969  Litt et al.
(Continued)

FOREIGN PATENT DOCUMENTS

CN    102585245 A    7/2012
EP      0331307 A2   9/1989
(Continued)

OTHER PUBLICATIONS

Faulkner et al, "Journal of colloidal and interface science", 351 (2010) 248-253.*
(Continued)

*Primary Examiner* — Krishnan S Menon
(74) *Attorney, Agent, or Firm* — Leydig, Voit & Mayer, Ltd.

(57) ABSTRACT

Disclosed are copolymers which are useful in hydrophilically modifying fluoropolymer membranes. An example of the copolymers is:

Poly(iM6)

(Continued)

Also disclosed are a method of preparing such copolymers, a method of modifying fluoropolymer membrane surfaces, and hydrophilic fluoropolymer porous membranes prepared from the copolymers.

11 Claims, 1 Drawing Sheet

(51) Int. Cl.
*B01D 67/00* (2006.01)
*C08J 5/22* (2006.01)
*C08J 7/04* (2006.01)
*B01D 69/10* (2006.01)

(52) U.S. Cl.
CPC ......... *B01D 67/0095* (2013.01); *B01D 69/10* (2013.01); *B01D 71/32* (2013.01); *C08J 5/2237* (2013.01); *C08J 7/047* (2013.01); *B01D 2323/02* (2013.01); *B01D 2323/30* (2013.01); *C08J 2327/18* (2013.01); *C08J 2427/12* (2013.01)

(56) References Cited

U.S. PATENT DOCUMENTS

| | | | |
|---|---|---|---|
| 3,574,784 A | 4/1971 | Litt et al. | |
| 4,136,237 A | 1/1979 | Takahashi et al. | |
| 4,975,507 A | 12/1990 | Asrar | |
| 5,117,327 A | 5/1992 | Asrar et al. | |
| 5,200,470 A | 4/1993 | Asrar | |
| 5,219,662 A | 6/1993 | Grimminger et al. | |
| 5,294,493 A | 3/1994 | Beckerbauer et al. | |
| 5,418,277 A | 5/1995 | Ma et al. | |
| 6,080,826 A | 6/2000 | Grubbs et al. | |
| 6,126,825 A | 10/2000 | Shinagawa et al. | |
| 6,303,725 B1 | 10/2001 | Chang et al. | |
| 6,313,222 B1 | 11/2001 | Lin et al. | |
| 6,436,476 B1 | 8/2002 | Sage, Jr. | |
| 6,492,443 B1 | 12/2002 | Kodemura et al. | |
| 6,653,424 B1 | 11/2003 | Sakamoto et al. | |
| 6,677,418 B1 | 1/2004 | Feast et al. | |
| 6,987,154 B2 | 1/2006 | Choi et al. | |
| 7,232,917 B2 | 6/2007 | Sumida et al. | |
| 7,514,499 B2 | 4/2009 | Tam et al. | |
| 8,143,369 B2 | 3/2012 | Fujiwara et al. | |
| 8,223,472 B1 | 7/2012 | Dirk et al. | |
| 8,283,410 B2 | 10/2012 | Musa | |
| 8,410,290 B2 | 4/2013 | Fujiwara et al. | |
| 8,431,625 B2 | 4/2013 | Luchterhandt et al. | |
| 8,678,203 B2 | 3/2014 | Knapp et al. | |
| 8,883,925 B2 | 11/2014 | Kizu et al. | |
| 9,169,361 B1 | 10/2015 | Aamer | |
| 9,441,078 B2 * | 9/2016 | Aamer | C08G 81/00 |
| 2006/0121217 A1 | 6/2006 | Childs et al. | |
| 2008/0234451 A1 | 9/2008 | Kenwright et al. | |
| 2009/0023877 A1 | 1/2009 | Liaw et al. | |
| 2009/0030175 A1 | 1/2009 | Yamamoto et al. | |
| 2009/0043059 A1 | 2/2009 | Liaw et al. | |
| 2009/0182117 A1 | 7/2009 | Takeyama et al. | |
| 2009/0188857 A1 | 7/2009 | Moore et al. | |
| 2009/0264608 A1 | 10/2009 | Wakatsuki et al. | |
| 2009/0269601 A1 | 10/2009 | Ishiguro et al. | |
| 2009/0275719 A1 | 11/2009 | Ishiguro et al. | |
| 2010/0056652 A1 | 3/2010 | Duong et al. | |
| 2011/0266220 A1 | 11/2011 | Campos et al. | |
| 2012/0041137 A1 | 2/2012 | Musa et al. | |
| 2012/0214940 A1 | 8/2012 | Hsu et al. | |
| 2012/0245271 A1 | 9/2012 | Pawlow et al. | |
| 2012/0288630 A1 | 11/2012 | Charkoudian et al. | |
| 2013/0030136 A1 | 1/2013 | Sunaga et al. | |
| 2013/0108845 A1 | 5/2013 | Tee et al. | |
| 2013/0281644 A1 | 10/2013 | Kiessling et al. | |
| 2013/0292872 A1 | 11/2013 | Knapp et al. | |
| 2014/0357820 A1 | 12/2014 | Stephen et al. | |

FOREIGN PATENT DOCUMENTS

| | | |
|---|---|---|
| EP | 0682978 A1 | 11/1995 |
| JP | H02-235928 A | 3/1989 |
| WO | WO 93/15255 | 8/1993 |
| WO | WO 94/10222 A1 | 5/1994 |
| WO | WO 2004/041397 A2 | 5/2004 |
| WO | WO 2011/125323 A1 | 10/2011 |

OTHER PUBLICATIONS

Vargas et al "Journal of Membrane Science", 361(2010) 78-88.*
European Patent Office, Extended European Search Report issued in European Application No. 15196307.1, 5 pp. (Sep. 5, 2016).
Korean Intellectual Property Office, Notice of Non-Final Rejection issued in Korean Application No. 10-2015-016335 (Sep. 28, 2016) 3 pp.
U.S. Appl. No. 14/675,562, filed Mar. 31, 2015.
U.S. Appl. No. 14/675,547, filed Mar. 31, 2015.
U.S. Appl. No. 14/675,528, filed Mar. 31, 2015.
U.S. Appl. No. 14/700,952, filed Apr. 30, 2015.
U.S. Appl. No. 14/675,592, filed Mar. 31, 2015.
Intellectual Property Office of Singapore, Search Report in Singapore Patent Application No. 10201509681R, Jan. 7, 2016, 4 pp.
Faulkner et al., "Surface-Initiated Polymerization of 5-(Perfluoro-n-alkyl)norbornenes from Gold Substrates," *Macromolecules*, 43(3), Jan. 4, 2010, pp. 1203-1209.
Ivanova et al., "Micellar structures of hydrophilic/lipophilic and hydrophilic/fluorophilic poly(2-oxazoline) diblock copolymers in water", *Macromol. Chem. Phys.*, 2008, vol. 209, pp. 2248-2258.

* cited by examiner

HYDROPHILICALLY MODIFIED FLUORINATED MEMBRANE (IV)

BACKGROUND OF THE INVENTION

The properties of fluoropolymer membranes, for example, porous PTFE membranes, including their mechanical strength, chemical resistance or inertness, non-adhesiveness, excellent dielectric property, thermal stability at high temperature and low coefficient of friction make them very attractive for various applications. However, for certain applications, it will be beneficial to modify the surface of PTFE without affecting its intrinsic properties. Efforts have been made to modify the surface and the chemical properties of PTFE membrane in order to improve the suitability of the membrane for specific applications. For example, efforts have included surface coating, blending, high energy surface modification, for example, broad band ultraviolet radiation or BBUV, where the membrane is exposed to a UV radiation of wavelength 250-450 nm, and plasma treatment, free radical, and ozone etching, atomic layer deposition, and synthesis of modified PTFE-like polymers. However, most of the efforts were focused on high energy treatment such as BBUV and plasma. Though the exact mechanism of these surface modification approaches is not reported, it likely results in the formation of free radicals by bond scission since C—C bond strength is known to be ~40% lower than F—F bond. If a majority of the radical results from C—C scission or main polymer chain scission, it could decrease the mechanical and the chemical stability of the PTFE membrane. It is also known that plasma treatment is limited to the surface of the membrane which makes it less stable during a long period of time.

The foregoing shows that there exists an unmet need for a surface modification of porous fluoropolymer membranes or supports to provide hydrophilic fluoropolymer porous membranes which are stable, and wherein the surface modification does not significantly affect the mechanical strength of the porous fluoropolymer supports or the resulting composite porous membranes.

BRIEF SUMMARY OF THE INVENTION

The invention provides a composite hydrophilic porous membrane comprising a porous fluoropolymer support and a coating comprising a copolymer, wherein the copolymer comprises repeat units A and B, wherein A is of the formula:

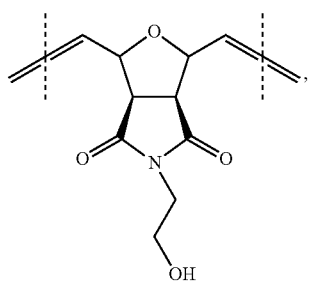

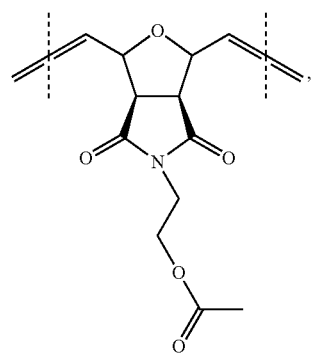

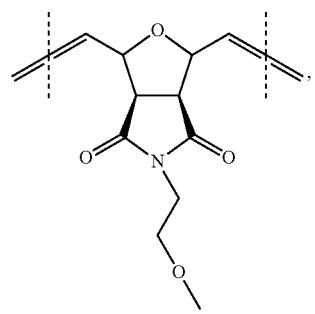

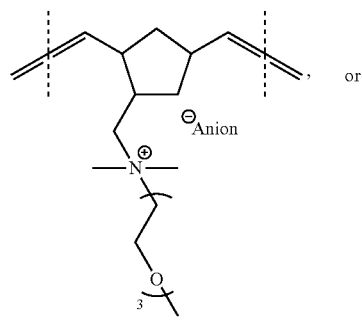

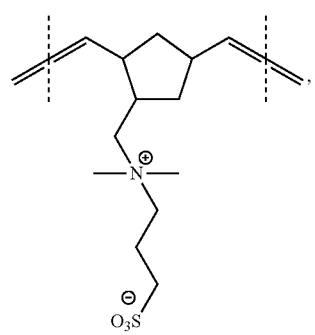

and B is of the formula

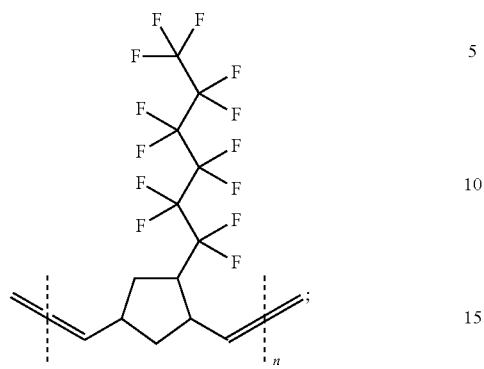

wherein:
the copolymer is a block copolymer or a random copolymer;
n and m, the number of repeat units A and B present in the copolymer, range from 1 to about 1000, provided the sum of n and m is equal to or greater than 10, wherein the copolymer is optionally crosslinked.

The invention also provides copolymers having ion-exchange or chelating functionalities.

The copolymers of the invention are useful in modifying the surface of porous fluoropolymer membranes or supports.

The present invention further provides methods of preparing the copolymers and methods of preparing hydrophilically modified fluoropolymer membranes.

BRIEF DESCRIPTION OF THE SEVERAL VIEWS OF THE DRAWING(S)

DETAILED DESCRIPTION OF THE INVENTION

Figure 1:
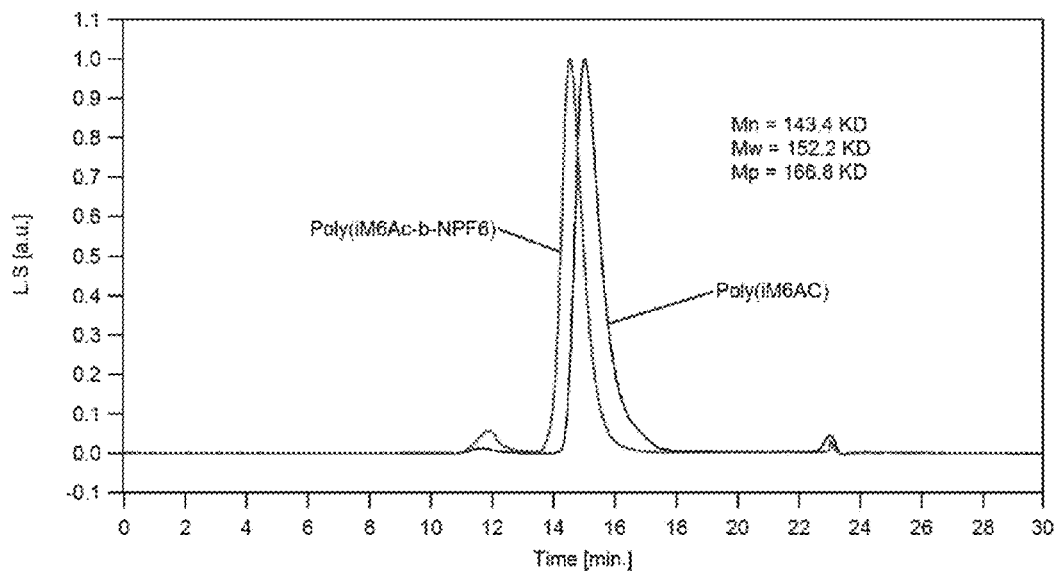
FIG. 1 depicts the GPC chromatograms of the poly (iM6Ac-b-NPF6) and poly(iM6Ac) in accordance with an embodiment of the invention.

In accordance with an embodiment, the invention provides a composite hydrophilic porous membrane comprising a porous fluoropolymer support and a coating comprising a copolymer, wherein the copolymer comprises repeat units A and B, wherein A is of the formula:

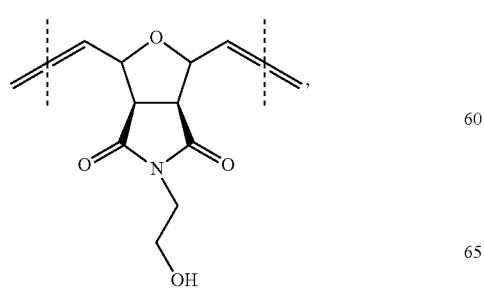

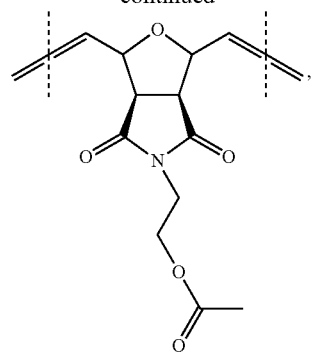

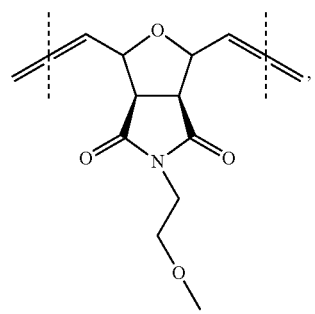

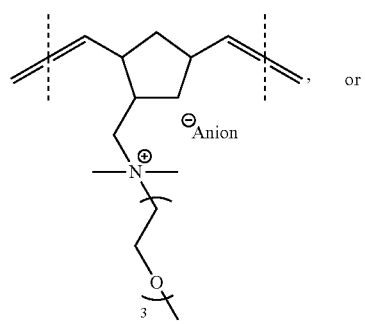
or

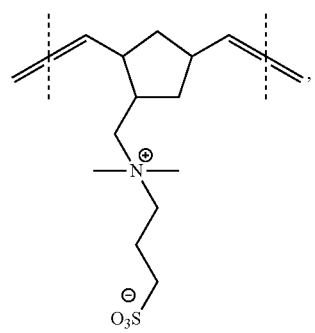

and B is of the formula

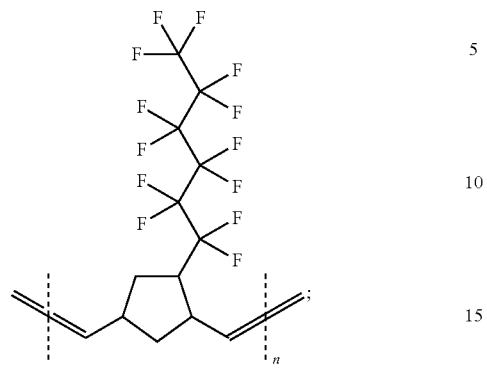

wherein:

the copolymer is a block copolymer or a random copolymer;

n and m, the number of repeat units A and B present in the copolymer, range from 1 to about 1000, provided the sum of n and m is equal to or greater than 10, wherein the copolymer is optionally crosslinked.

In the formulas herein, dotted lines on the formulas of the repeat units indicate that the copolymer can be a block copolymer or a random copolymer. Block copolymer are indicated by parentheses: (repeat unit). Random copolymers are indicated by square brackets: [repeat unit].

In embodiments, n and m represent the degrees of polymerization of the respective monomers, and are independently from about 10 to about 1000, preferably from about 20 to about 50.

In other embodiments, n and m represent the mole fraction of the monomers present in the copolymer and n and m can independently range between 1 to 99 mole %, preferably 20 to 50 mole %.

The copolymer could be a block copolymer or a random copolymer. The block copolymer could be a diblock (A-B), triblock (A-B-A or B-A-B), or multiblock copolymer ((A-B)x). Optionally, the copolymer can have a third segment C, for example, a triblock copolymer or a random copolymer such as A-B-C.

The copolymer can be of any suitable molecular weight, for example, in an embodiment, a number or weight (Mn or Mw) average molecular weight from about 10 kDa to about 1000 kDa, preferably from about 75 kDa to about 500 kDa, and more preferably from about 250 kDa to about 500 kDa.

The respective monomer blocks can be present in the block copolymer in any suitable mass %, for example, in an embodiment, from about 99%: about 1% to about 50%: about 50%, preferably from about 90%: about 10% to about 70%: about 30%, and more preferably from about 75%: about 25%.

The copolymers can have any suitable chain ends, for example, chain ends selected from aryl groups and alkoxy groups, preferably phenyl and ethoxy groups.

The anion could be any suitable anion, for example, fluoride, chloride, bromide, or iodide, tosylate, mesylate, besylate, sulfonate, sulfate, phosphate, or phosphonate.

In accordance with an embodiment, the copolymer has one of the following formulae:

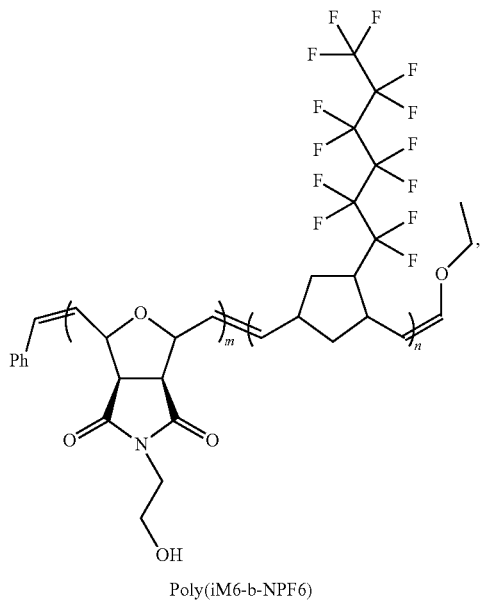

Poly(iM6-b-NPF6)

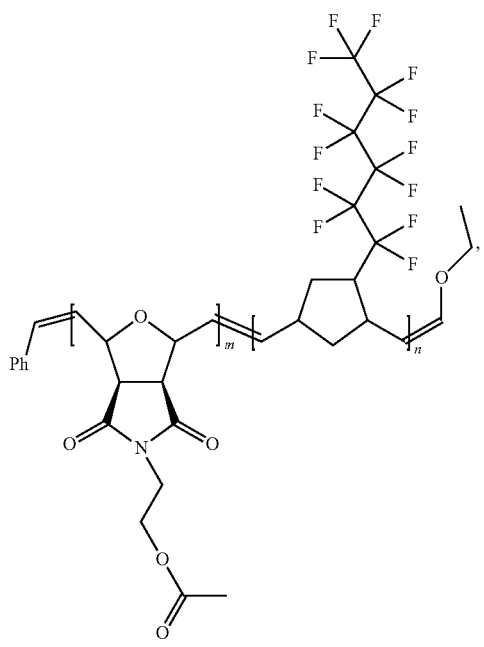

7
-continued

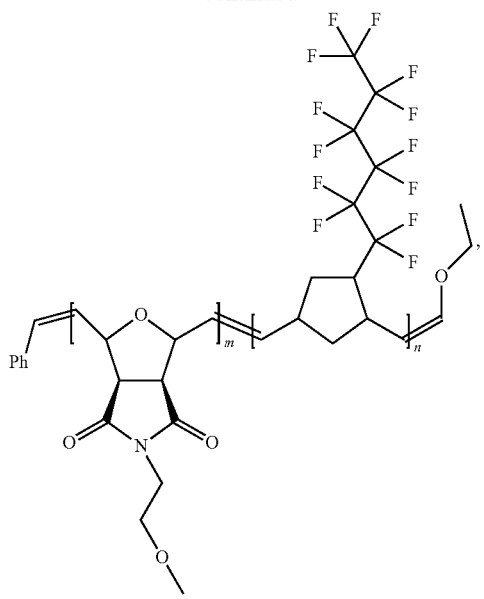

8
-continued

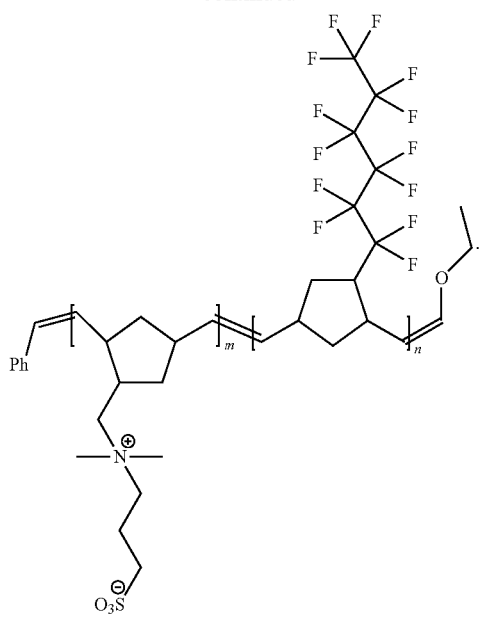

The copolymers of the invention can be prepared by any suitable method, for example, through ring opening metathesis polymerization (ROMP) of cyclic monomers. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

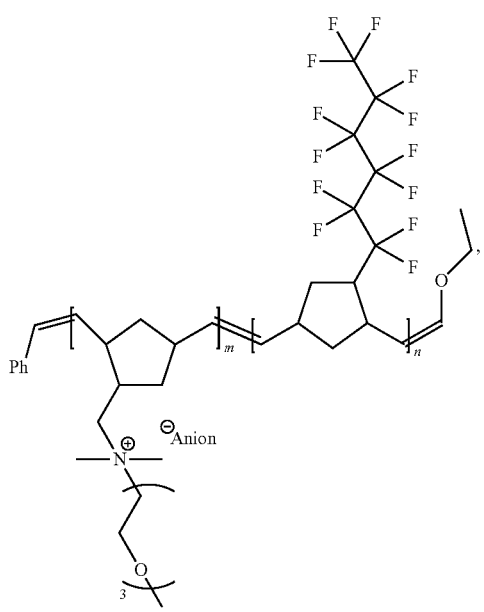

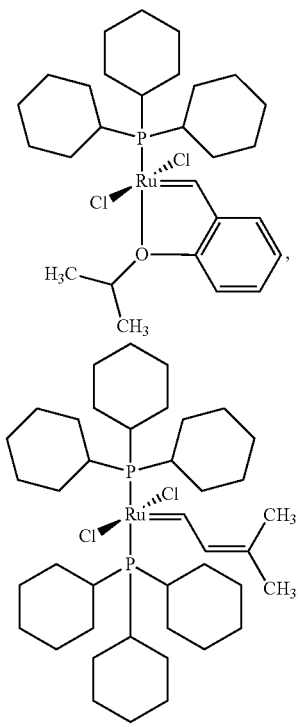

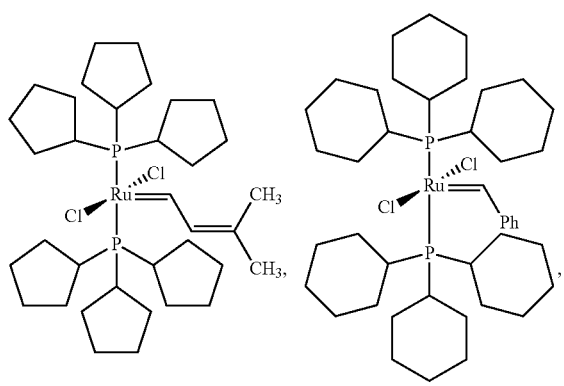
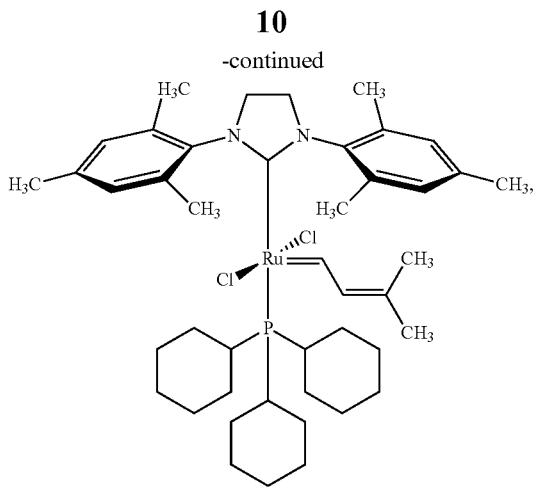
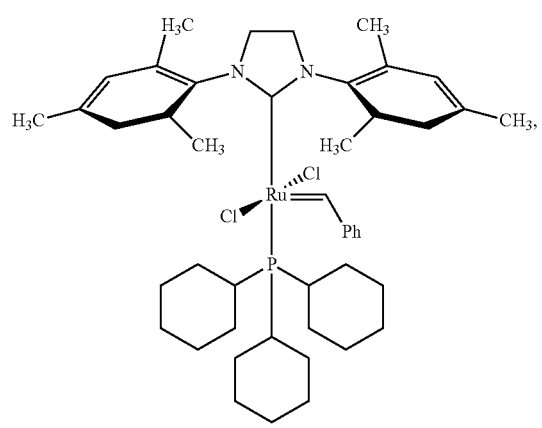
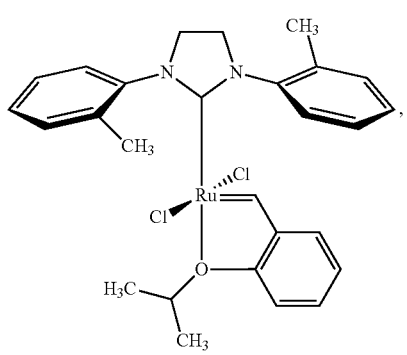
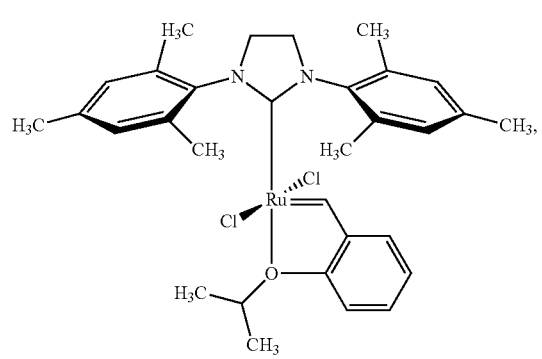
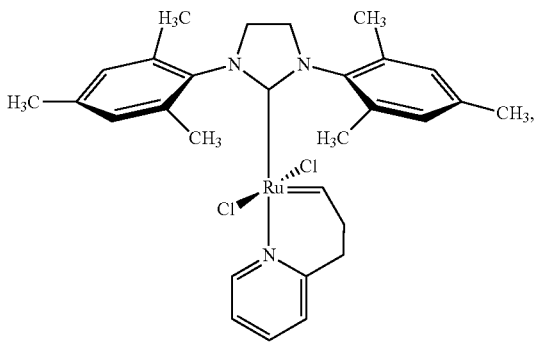
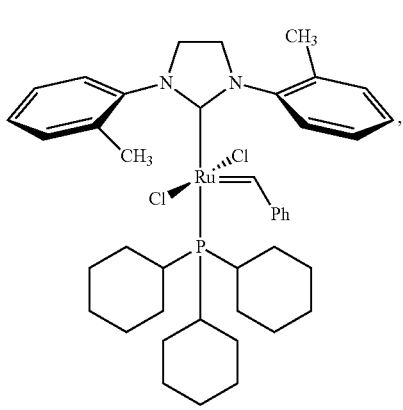
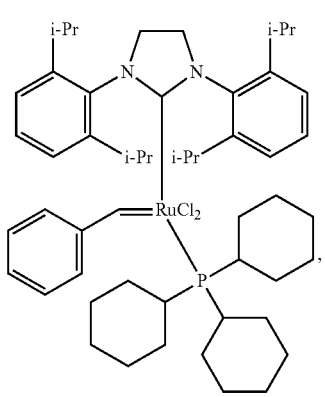

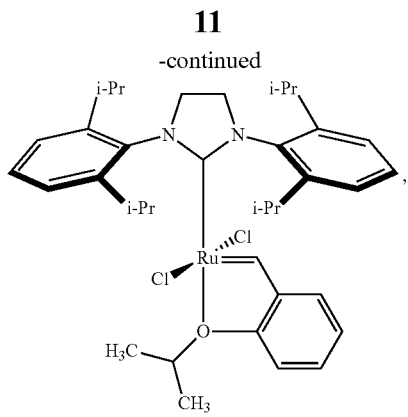

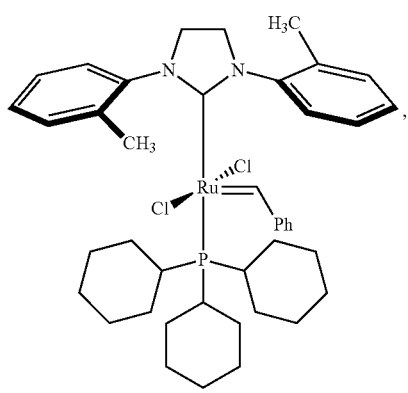

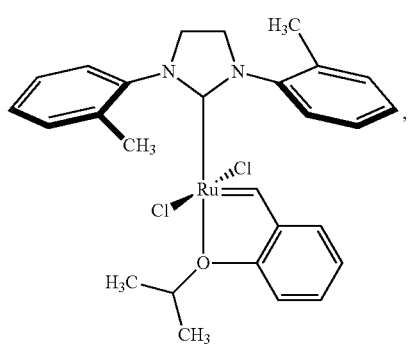

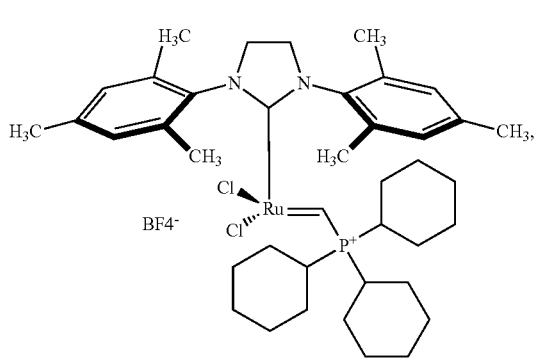

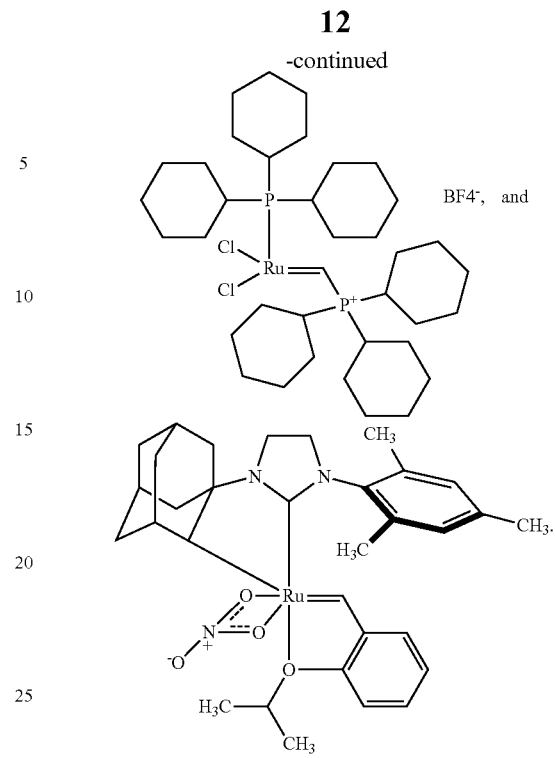

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

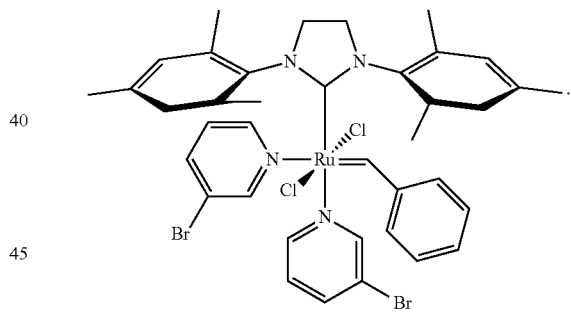

The above third generation Grubbs catalyst (G3) may be obtained commercially or prepared from a Grubbs second generation catalyst (G2) as follows:

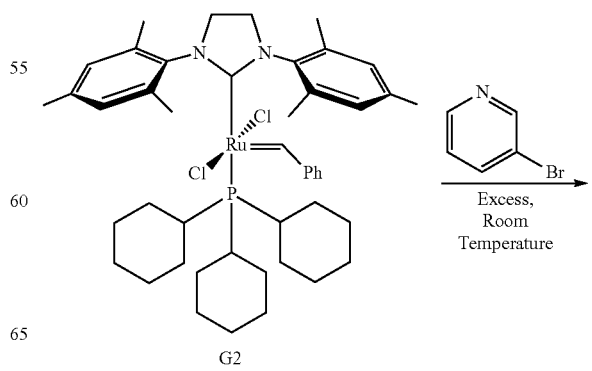

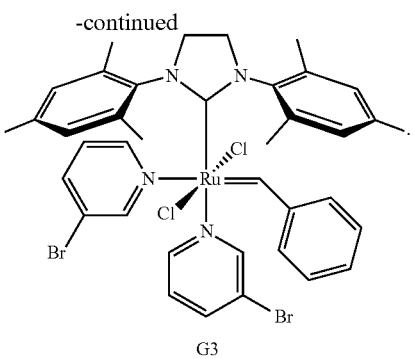

G3

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

The polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

The copolymer can be isolated by a suitable technique, for example, precipitation with a nonsolvent.

The copolymers of the invention can be characterized for their molecular weights and molecular weight distributions by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The copolymers of the invention are highly monodisperse. For example, the copolymers have an Mw/Mn of 1.05 to 1.5, preferably 1.1 to 1.2.

The present invention further provides a method of preparing a copolymer in accordance with an embodiment of the invention, comprising:

(i) polymerizing (a) N-hydroxyethyl exo-7-oxanorbornene 5,6-dicarboximide (iM6), (b) N-acetoxyethyl exo-7-oxanorbornene 5,6-dicarboximide (AciM6), or (c) N-methoxyethyl exo-7-oxanorbornene 5,6-dicarboximide (M11), catalyzed by a ring opening metathesis polymerization (ROMP) catalyst to obtain a homopolymer poly(iM6), poly(AciM6), or poly(M11); and (ii) sequentially polymerizing on a chain end of the homopolymer obtained in (i) 5-(Perfluoro-n-hexyl) norbornene or bicycle [2-2-1] hept-2-enes mono perfluorohexane or 5-(Perfluoro-n-octyl) norbornene or bicycle [2-2-1] hept-2-enes mono perfluorooctane, catalyzed by a ROMP catalyst.

The present invention further provides a method of preparing a copolymer in accordance with another embodiment of the invention, comprising:

(i) polymerizing an N-(mono methoxy triethyleneoxide) dimethyl ammonium exo-7-norbornene 5,6-dicarboximide (QNTEG) salt or an N-(sulfonylpropyl)dimethyl ammonium exo-7-norbornene 5,6-dicarboximide (Sulfobetaine Zwitterionic NorBornene, SZNB), catalyzed by a ROMP catalyst to obtain a homopolymer; and (ii) sequentially polymerizing on a chain end of the homopolymer obtained in (i) 5-(Perfluoro-n-hexyl) norbornene or bicycle [2-2-1] hept-2-enes mono perfluorohexane or 5-(Perfluoro-n-octyl) norbornene or bicycle [2-2-1] hept-2-enes mono perfluorooctane, catalyzed by a ROMP catalyst.

Monomers QNTEG and SZNB can be prepared starting from norbornene-carboxaldehyde as illustrated below. The central intermediate is the tertiary amine (NMDMA) synthesized through reductive alkylation of 5-norbornene-2-carboxaldehyde (with e.g., dimethylamine). It is then alkylated with either 1,3-propanesultone (towards SZNB) or with a tosylate of triethyleneglycol monomethyl ether. In addition, the carboxybetaine monomer (CZNB) can be synthesized by alkylation with e.g. beta-propiolactone or bromoacetic acid (or its ester, followed by ester hydrolysis).

Norbornene-carboxaldehyde

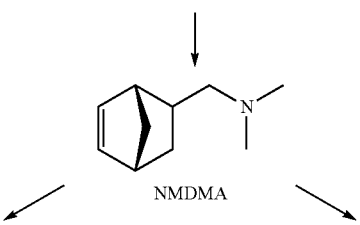

NMDMA

-continued

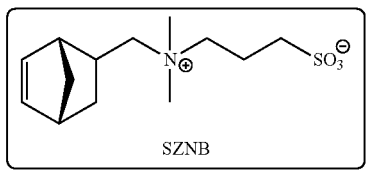
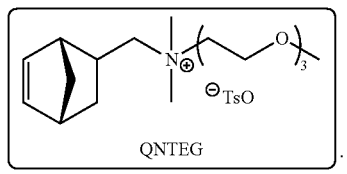

In the above methods, polymerization can be terminated in a suitable manner, for example, by the use of alkyl vinyl ether such as ethyl vinyl ether.

The present invention further provides a composite hydrophilic membrane comprising a porous fluoropolymer support and a coating comprising the copolymer described above, wherein the copolymer is optionally crosslinked.

The present invention further provides a method of hydrophilically modifying a fluoropolymer support comprising:

(i) providing a porous fluoropolymer support;

(ii) coating the porous fluoropolymer support with a solution comprising a solvent and a copolymer described above;

(iii) drying the coated support from (ii) to remove at least some of the solvent from the solution comprising said copolymer or homopolymer; and optionally (iv) crosslinking said copolymer in the coated support.

In an embodiment, the porous fluoropolymer support is pre-wet with a solvent such as isopropanol before coating it with the solution comprising a solvent and the copolymer.

In an embodiment, the coated support is dried at a temperature between 100° C. and 160° C.

Figure 2:
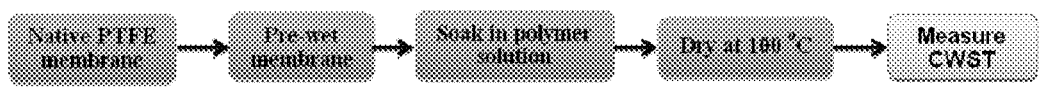
FIG. 2 illustrates a procedure to coat a porous fluoropolymer support with a copolymer in accordance with an embodiment of the invention and measure the surface tension of the coated membrane.
Figure 3:
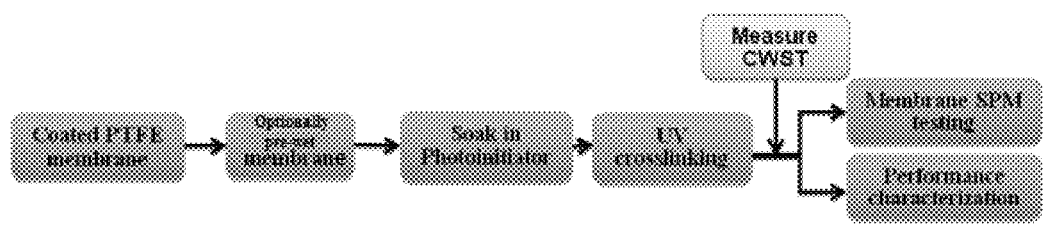
FIG. 3 illustrates a procedure to coat a porous fluoropolymer support with a copolymer in accordance with an embodiment of the invention, and crosslink the copolymer, and measure the surface tension of the coated membrane.

FIG. 2 illustrates a process for coating the porous fluoropolymer support with a copolymer in accordance with an embodiment of the invention. FIG. 3 illustrates a method of crosslinking the coating on a porous fluoropolymer support in accordance with an embodiment of the invention.

Crosslinking can be carried out by any suitable method, for example, by the use of a photoinitiator and a high energy radiation, e.g., UV. It is contemplated that the crosslinking provides a highly stable polymer network in the membrane.

Any suitable photoinitiator can be used, for example, Type I and Type II photoinitiators. Examples of photoinitiators include camphor quinone, benzophenone, benzophenone derivatives, acetophenone, acetophenone derivatives, phosphine oxides and derivatives, benzoin alkyl ethers benzil ketals, phenylglyoxalic esters and derivatives thereof, dimeric phenylglyoxalic esters, peresters, halomethyltriazines, hexaarylbisimidazole/coinitiators systems, ferrocenium compounds, titanocenes, and combinations thereof.

The crosslinking can be carried out as follows. The polymer coated PTFE sheets are optionally pre-wet with IPA, the sheets are then washed with the solvent with which the photo-initiator is prepared in to exchange IPA with that solvent. The sheets are then soaked in a solution of photo-initiator with certain concentration for a certain time followed by exposure to UV irradiation. The soaking time in photo-initiator solution ranges from 1 minute to 24 hours. The UV irradiation time ranges from 30 seconds to 24 hours. The membrane critical wetting surface tension (CWST), performance characterization, and/or SPM testing are then measured. "SPM" means hot sulfuric acid hydrogen peroxide mixture ($H_2SO_4$ (96%):$H_2O_2$ (30%) of 80:20 by volume) at 120 to 180° C.

In accordance with an embodiment of the invention, the hydrophilic fluoropolymer membrane is a porous membrane, e.g., a nanoporous membrane, for example, a membrane having pores of diameter between 1 nm and 100 nm, or a microporous membrane having pores of diameter between 1 μm and 10 μm.

The surface tension of the resulting porous membrane can be determined as follows. For example, a sheet of PTFE porous support is coated at room temperature by pre-wetting the membrane sheet with IPA solvent and soaking the membrane in a coating polymer solution with concentration that ranges between 0.1% and 10% by mass. The coating time ranges between (1 min to 12 hours). After soaking the support, it is dried in convection oven at 100° C. to 160° C. The drying time ranges between (10 minutes to 12 h). The resulting porous PTFE membrane's wetting characteristics are measured by measuring the critical wetting surface tension.

The change in surface modification in terms of surface tension was measured by measuring the critical wetting surface tension (CWST). The method relies on a set of solutions of certain composition. Each solution has specific surface tension. The solution's surface tension ranges from 25 to 92 dyne/cm in small non-equivalent increments. To measure the membrane surface tension, the membrane is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

The hydrophilic fluoropolymer porous membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the hydrophilic fluoropolymer membrane can have a variety of configurations, including planar, flat sheet, pleated, tubular, spiral, and hollow fiber.

The hydrophilic fluoropolymer porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

In accordance with an embodiment, the hydrophilic fluorocarbon porous membrane comprises any suitable fluoropolymer support, for example, PTFE, PVDF (polyvinylidene fluoride), PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane, preferably PTFE and PVDF.

The present invention further provides a hydrophilically modified fluoropolymer porous membranes produced by the method described above.

The present invention further provides a method of filtering a fluid, the method comprising passing the fluid through the porous membranes described above.

The following examples further illustrate the invention but, of course, should not be construed as in any way limiting its scope.

EXAMPLE 1

Materials

The following materials were purchased and used as received.

Dimethyl 5-norbornene-2,3-dicarboxylate (C3) was purchased from Alfa Aesar,

Dichloromethane (DCM) was stored over activated Alumina and purged with Argon before use, Isopropyl alcohol (IPA), dicyclopentadiene (DCPD), 1H,1H,2H-Perflouro-1-octene (PF6), 1H,1H,2H-Perflouro-1-dodecene (PF10), toluene, thionyl chloride, ethylacetate, dimethylformamide (DMF), Maleimide, furan, diisopropylazodicarboxylate (DIAD), triphenylphosphine (Ph$_3$P), 1-haxadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use. Cyclooctadiene (COD) was purified by vacuum distillation from borane in tetrahydrofuran and used fresh.

EXAMPLE 2

This example illustrates the preparation of dichloro[1,3-bis(2,4,6-trimethylphenyl)-2-imidazolidinylidene](benzylidene)bis(3-bromopyridine)ruthenium(II) (G3) catalyst.

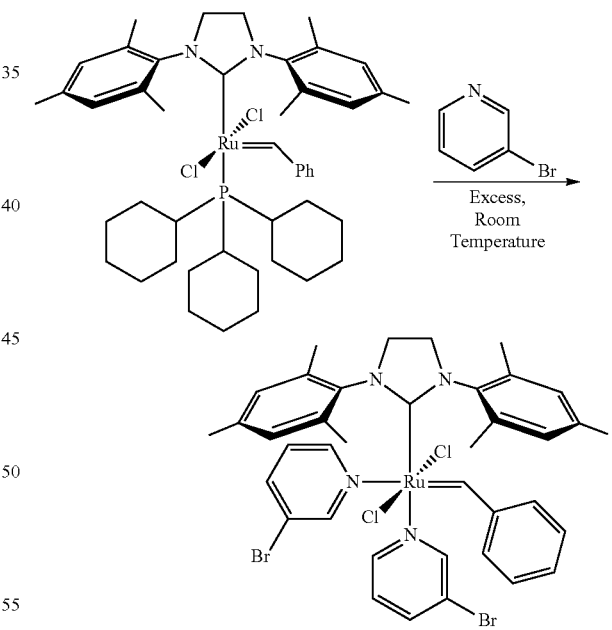

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

EXAMPLE 3

This example illustrates the gel permeation chromatographic characterization of the homopolymer and copolymers in accordance with an embodiment of the invention.

The homopolymer and block copolymer obtained was characterized for their molecular weight and molecular weight distribution properties by the MALS-GPC technique under the following conditions:

Mobile phase: Dichloromethane (DCM).
Mobile phase temperature: 30° C.
UV wavelength: 245 nm.
Columns used: three PSS SVD Lux analytical columns (styrene-divinylbenzene copolymer network), columns having as stationary phase beads of diameter 5 μm and pore sizes of 1000 A, 100,000 A, and 1,000,000 A, and guard columns.
Flow rate: 1 mL/min.
GPC system: waters HPLC alliance e2695 system with UV and RI detectors
MALS system: The DAWN HELEOS 8 system with 8 detectors operating a laser at 664.5 nm.

EXAMPLE 4

This example illustrates a procedure to prepare NPF6 monomer in accordance with an embodiment of the invention.

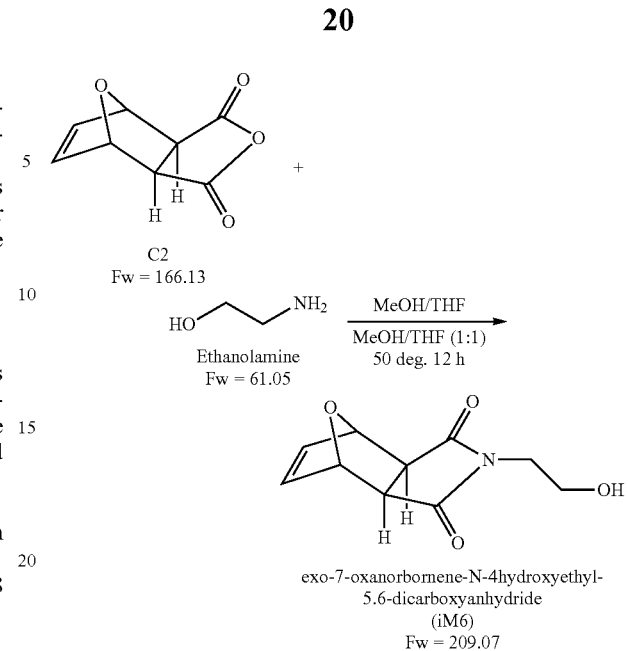

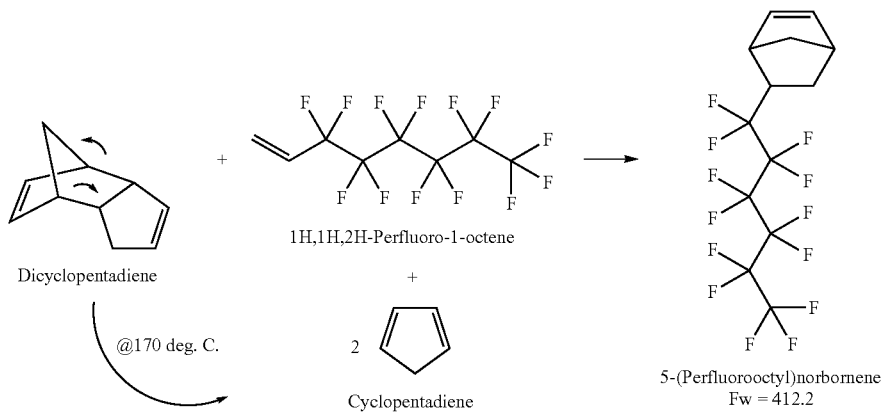 [SMILES: C1=CC2C3C=CC(C3)C2C1 ; C=CC(F)(F)C(F)(F)C(F)(F)C(F)(F)C(F)(F)C(F)(F)F ; C1=CCC=C1 ; FC(F)(F)C(F)(F)C(F)(F)C(F)(F)C(F)(F)C(F)(F)C1CC2C=CC1C2]

A Parr high pressure reactor cylinder vessel was charged with DCPD (100 ml, 737 mmol), PF6 (168 ml, 737 mmol) and the cylinder was attached to the reactor, and hydroquinone (2.43 g, 22.1 mmol), heated to 170° C. for 72 hours. The reaction content was dissolved into 150 ml DCM and transferred into 500 ml round bottom flask to purify the monomer by vacuum distillation.

$^1$H-NMR (CDCl$_3$): δ (ppm) 6.2-6.0 (2H), 3.2 (1H), 3.0 (1H), 2.8 (1H), 2.0 (1H), 1.5 (1H), and 1.2-1.4 (2H).
$^{19}$F-NMR (CDCl$_3$): δ −89.9 (s), −112.6 (m), −123.8 to −121.3 (m), −127.1 to −125.3 (m).

EXAMPLE 5

This example demonstrates the synthesis of iM6 and iM6Ac in accordance with an embodiment of the invention.

To 500 ml RBF, norbornene-5,6-dicarboxyanhydride (25 g, 1.5 mol) was dissolved in mixture of MeOH/THF (300 ml), aminoethanol (9 ml, 1.5 mol) was added to the solution slowly drop wise. A stark-dean trap to collect water was attached to a condenser attached to the RBF. The solution was refluxed for 24 hours after which the solvent was removed from the yellow solution till dryness and to obtain the monomer. The solid was dissolved in ethylacetate, washed with K$_2$CO$_3$ solution (200 ml, 2×), washed with DI water (200 ml, 2×) and dried over MgSO4. The yellow solution was concentrated to give the monomer and purified by crystallization from MeOH.

$^1$H-NMR (CDCl$_3$): δ (ppm) 6.5 (s, 2H), 5.25 (s, 2H), 3.6 to 3.9 (m, 4H), 2.29 (s, 2H), 2.3 to 2.6 (s, broad, H).

iM6 (25 g, 120 mmol), acetic anhydride (14 ml, 240 mmol, 0.18 ml) were mixed. The mixture was refluxed for 3 h. Upon completion, the reaction mixture was diluted with sodium bicarbonate 10% (15 ml) and extracted with CH$_2$Cl$_2$ (3×20 mL). Combined organic layers were dried over MgSO$_4$, the solvent was removed by evaporation to afford the acetylated compound iM6-Ac.

EXAMPLE 6
This example demonstrates the properties of Poly(iM6-b-NPF6) in accordance with an embodiment of the invention.
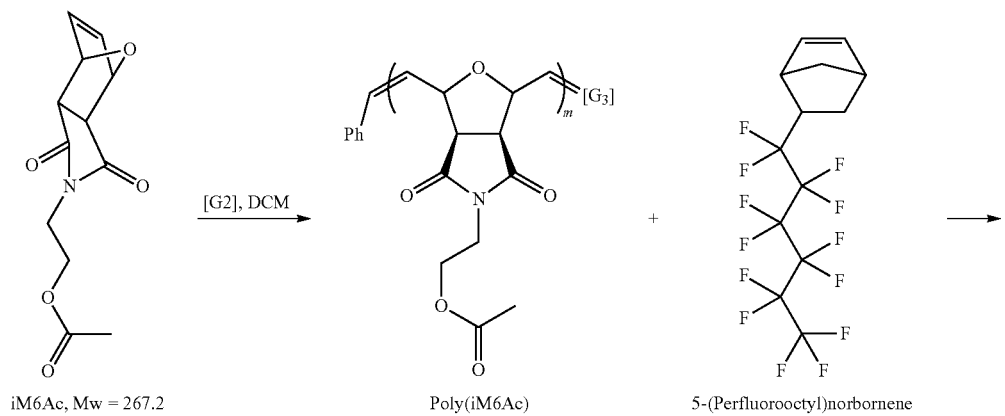
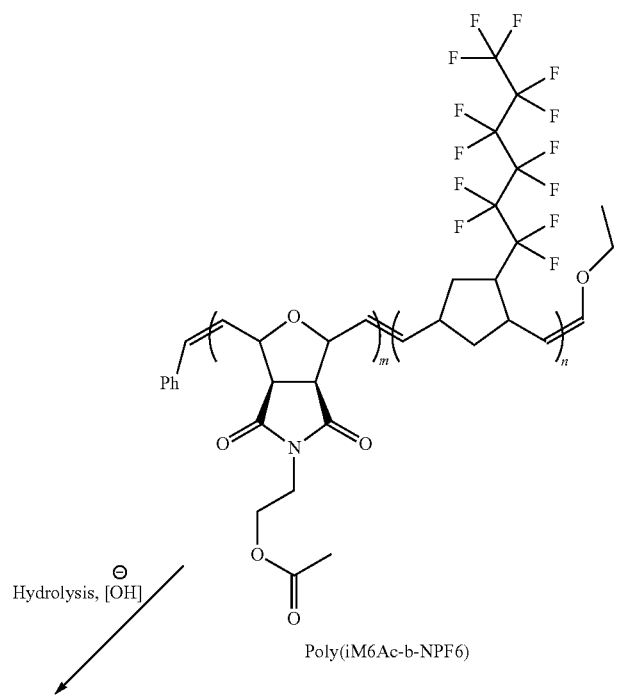

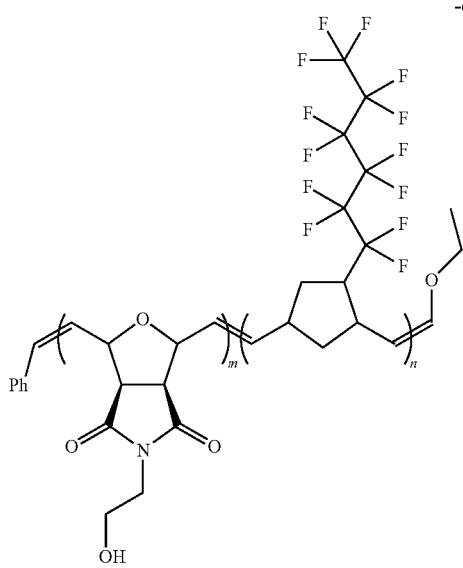

Poly(iM6-b-NPF6)

The Grubbs 2^rd generation (G2) catalyst (16 mg, 0.018 mmol) and triphenylphosphine (245 mg, 0.94 mmol) were weighed in 40 mL vial with equipped with fluoropolymer resin-silicone septa open-top cap. The catalyst was dissolved in argon-degassed dichloromethane (DCM) (40 mL) and transferred via cannula to a clean 1 L RBF equipped with stirring bar. A solution of the first monomer iM6-Ac (2.0 g, 6.42 mmol) in DCM (100 mL) was degassed with argon and transferred into the catalyst solution and shined for 30 minutes. An aliquot of 1-2 mL of the homopolymer formed from the first monomer was taken after 30 minutes for molecular weight characterization. A solution of the second monomer NPF6 (1.2 g, 2.81 mmol) in DCM (200 mL) was degassed with argon and transferred into the growing homopolymer solution in the RBF, and the contents of the flask were stirred for another 180 minutes. Ethyl vinyl ether (2 mL) was then added to the yellow solution of the diblock copolymer to terminate the polymerization. The resulting polymer was precipitated in methanol (2 L, 2×) to recover the pure polymer as a white solid. The polymer was filtered and dried under vacuum at room temperature; yield (9.2 g, 98%). The GPC chromatograms of the poly(iM6Ac-b-NPF6) and poly(iM6Ac) are depicted in FIG. 1.

The Poly(iM6Ac-b-NPF6) was hydrolyzed to generate Poly(iM6-b-NPF6) by two methods. The first was to coat Poly(iM6Ac-b-NPF6) on the PTFE membrane using the standard coating process described previously followed by soaking the membrane in alcoholic KOH solution in IPA to de-protect the acetyl group and generate the Poly(iM6-b-NPF6) in situ. The second process involved de-protection in solutions using basic bath of aqueous KOH while the polymer is dissolved in THF resulting in polymer precipitation of Poly(iM6-b-NPF6).

$^1$H-NMR (300 MHz, CDCl3): δ (ppm) 6.5 to 6.0 (s, broad), 5.75 to 5.6 (m, broad), 5.65 to 5.2 (m, broad), 5.0 to 4.4 (m, broad), 4.5 to 4.0 (m, broad), 4.0 to 3.6 (s, broad), 3.5 to 2.9 (m, broad), 2.5 to 1.3 (m, broad).

The ability of the copolymer to adsorb to fluoropolymer substrate was tested by dip coating the PTFE membrane in a 1% (w/v) solution for 1 h and testing the wettability of the coated membrane by measuring instant critical wetting surface tension (CWST) for the membrane surface, as illustrated in FIG. 2. Out of the solvents that are able to dissolve the Polp(iM6-b-NPF6) diblock copolymer, DMAC and TFE/DCM (1:1) mixture were chosen for the coating experiments, since both wet the "native" PTFE membrane.

In order to further stabilize the copolymer layer, the coated membrane was subjected to a crosslinking process by 5 min soaking in a 0.25% aqueous solution of the photoinitiator (Irgacure 2959) followed by the UV irradiation for 60 seconds, as illustrated in FIG. 3.

Samples after the crosslinking step were challenged with an 80/20 mixture of concentrated sulfuric acid and hydrogen peroxide at 140° C. for 3 h ("hot SPM"), followed by a 12 h DI trickle wash and drying.

The wettability results after each step are summarized in Table 1.

TABLE 1

| Polymer Batch | Solvent (1% w/v) | CWST-1 (dynes/cm2) | Crosslinking Conditions | CWST-2 (dynes/cm2) | CWST-3 (dynes/cm2) after "hot SPM" |
|---|---|---|---|---|---|
| Poly(iM6-b-NPF6) | TFE/DCM (1:1) | 33 | Irgacure 2959 UV irrad 60 s | 33 | 30 |
| Poly(iM6-b-NPF6) | DMAC | 40 (partial 44) | Irgacure 2959 UV irrad 60 s | 33 (partial 35) | 30 |

Application of copolymer increased the surface energy of the PTFE membrane, as indicated by CWST's in the 33-40 range, whereas for the untreated, "native" PTFE membrane it is 25.4 dynes/cm.

EXAMPLE 7

This example demonstrates the synthesis and properties of Poly(SZNB-NPF6) in accordance with an embodiment of the invention. A variety of the poly(SZNB-NPF6) copolymers (poly(SZNB-r-NPF6), poly(SZNB-b-NPF6)-1, poly(SZNB) homopolymer, and poly(SZNB-b-NPF6)) were synthesized. Their general structure has been confirmed by NMR spectroscopy. Results of elemental analysis, specifically N to F ratio, combined with the recovered yield of the precipitated copolymers have been applied to estimate their ultimate composition.

NMDMA:

5-Norbornene-2-carboxaldehyde (20 mL; ca. 149 mmol) has been diluted with the 2M solution of dimethylamine in THF, while vigorously stirring for 30 min at ambient temperature. Solid sodium triacetoxyborohydride (40 g; ca. 180 mmol) has been added in portions over 10 min during which time an exothermic reaction has been observed. At this time the mixture was diluted with anhydrous 1,2-dichloroethane (50 mL) and stirring was continued for 16 h. The reaction mixture was quenched by pouring into excess of saturated sodium bicarbonate solution, followed by extraction with dichloromethane (150 mL). The bottom, organic layer has been separated and extracted with saturated bicarbonate solution, brine and then dried over anhydrous magnesium sulfate. After decantation the organic phase has been diluted with two volumes of pentane and the insoluble material was filtered out, followed by concentration by roto-evaporation, while not exceeding vacuum of 30 torr and bath temperature of 50° C. The resulting brown liquid (18.2 g corresponding to 81% crude yield) has been deemed sufficiently pure by NMR to carry on to the alkylation step as-is.

SZNB:

The 12.5 g of tertiary amine described under NMDMA has been diluted with anhydrous THF (80 mL) followed by the drop-wise addition of the solution of 1,3-propanesultone (12.5 g; ca. 1.2. equivalent) dissolved in anhydrous THF (30 mL) over 15 min at ambient temperature and while maintaining vigorous stirring. The progress of the reaction was visible by the formation of the increasing amount of a precipitate. After 24 h the solids were filtered off and washed several times with anhydrous THF and finally once with diethyl ether. The resulting product was dried under house vacuum at 60° C. overnight and finally monomer SZNB was obtained in 12.8 g yield (59%). The desired structure was confirmed by the NMR (in deuterium oxide) and by LCMS where the desired molecular peak of 274.4 was observed. The purity sufficient for the ROMP polymerization protocol was confirmed by the elemental analysis (calc. C, 57.11, H, 8.48, N, 5.12, S, 11.93: found C, 56.07, H, 9.37, N, 4.85, S, 11.15).

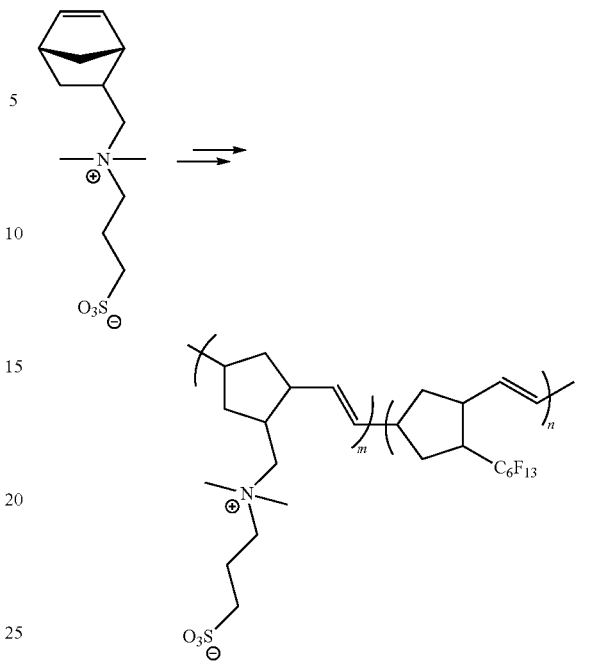

Poly(SZNB-r-NPF6) Random, 55 mol % SZNB, ~75 kDa
Poly(SZNB-b-NPF6)-1 Diblock, 82 mol % SZNB, ~108 kDa
Poly(SZNB) Homo-PSZNB, ~66 kDa
Poly(SZNB-r-NPF6)-2 Diblock, 76 mol % SZNB, ~61 kDa General Polymerization Protocol:

ROMP was performed under positive pressure of argon in solvents stored over basic alumina and extensively purged with argon. The solutions were transferred between flasks by cannulation. All operations were performed at ambient temperature. Typically, the $3^{rd}$ generation Grubbs initiator (G3) was weighed into a round-bottom flask purged with argon, followed by dissolution with the appropriate solvent and addition of the monomer solution either in sequence (for block copolymer synthesis) or as a mixture (for a random copolymer). After the appropriate time the polymerization was terminated by the addition of excess of ethyl vinyl ether (EVE), stirring for 30 min and finally precipitation by drop-wise addition to approximately ten volumes of an appropriate non-solvent. After removal of the supernatant the solids were washed several times with the non-solvent, followed by dissolution (typically in TFE) for transferring into a tarred flask for the roto-evaporation in vacuo to constant weight.

Poly(SZNB-r-NPF6):

To a solution of G3 (14 mg) in TFE (10 mL) the mixture of SZNB (1.7 g) and NPF6 (0.64 g) dissolved together in TFE (40 mL) was added and stirring was maintained for 16 h, followed by the EVE quench and precipitation in methanol. Recovery was 2.05 g (85% of the total monomer feed). Elemental analysis—found C, 44.38; H, 6.19; F, 25.41; N, 2.46; S, 5.90.

Poly(SZNB-b-NPF6)-1:

To a solution of G3 (26 mg) in TFE (10 mL) the solution of SZNB (3.16 g) in TFE (60 mL) was added followed by stirring for 2 h. Next, the solution of NPF6 (1.19 g) in TFE (10 mL) was added. Shortly afterwards the reaction mixture got turbid and the formation of precipitate started. After another 30 min and the EVE quench the precipitate was filtered off, washed with methanol followed by the analysis identifying it as predominantly the homopolymer of NPF6. The precipitate formed in the filtrate combined with the methanol washes was isolated. Recovery was 3.15 g (72% of the total monomer feed). Elemental analysis—found C, 45.84, H, 7.25, F, 14.37, N, 3.45, S, 8.27.

Poly(SZNB) Homopolymer:

To a solution of G3 (9 mg) in DCM (15 mL) the solution of SZNB (1.05 g) in TFE (20 mL) was added followed by stirring for 1 h. Then, the solution of NPF6 (0.4 g) dissolved in DCM (5 mL) was added and stirring was maintained for 30 min, followed by the EVE quench and precipitation in methanol. Recovery was 0.84 g (58% of the total monomer feed). Elemental analysis—found C, 50.17, H, 9.62, F, 1.11, N, 4.24, S, 10.28.

Poly(SZNB-b-NPF6)-2:

To a solution of G3 (26 mg) in a 1:1 TFE/DCM mixture (20 mL) the solution of SZNB (3.21 g) in a 1:1 TFE/DCM mixture (80 mL) was added followed by stirring for 2 h. Then, the solution of NPF6 (1.21 g) dissolved in a 1:1 TFE/DCM mixture (20 mL) was added and stirring was maintained for 30 min, followed by the EVE quench and precipitation in diethyl ether. The precipitate was extracted with warm methanol (100 mL) for 16 h, followed by drying to constant weight. Recovery was 1.83 g (41% of the total monomer feed). Elemental analysis—found C, 48.02, H, 6.98, F, 17.11, N, 3.31, S, 7.41.

The ability of the copolymer to adsorb to fluoropolymer substrate was tested by dip coating the PTFE membrane in a 1% (w/v) solution for 1 h and testing the wettability of the coated membrane by measuring instant CWST for the membrane surface. 2,2,2-Trifluoroethanol (TFE) was chosen as the solvent due to its ability to both solubilize the SZNB-derived copolymers and wet the "native" PTFE membrane.

In order to further stabilize the copolymer layer the coated membrane has been subjected to crosslinking process by soaking in the solution of the photoinitiator for 5 min followed by the UV irradiation for 60 seconds. Specific conditions applied are listed in a Table below.

Samples after the crosslinking step were then challenged with the 80:20 mixture of concentrated sulfuric acid and hydrogen peroxide at 140° C. for 3 h (so called "hot SPM"), followed by a 12 h DI trickle wash and drying.

The wettability results after each step are summarized in Table 2 below.

The copolymers clearly increased the surface energy of the PTFE membrane, as indicated by CWST's in the 33-48 range, whereas for the untreated, "native" PTFE membrane it is 25.4 dynes/cm.

TABLE 2

| Polymer Batch | SZNB (mol %) | CWST-1 (dynes/cm2) | Crosslinking Conditions | CWST-2 (dynes/cm2) | CWST-3 (dynes/cm2) after"hot SPM" |
|---|---|---|---|---|---|
| poly(SZNB-r-NPF6), (random) | 55 | 40 (44) | Irgacure 819 (0.1% MeOH/DI) | 48 | 30 |
| poly(SZNB-r-NPF6), (random) | 55 | 40 (44) | Irgacure 2959 (0.25% in DI) | 48 | 30 |
| poly(SZNB-b-NPF6)-1, (diblock) | 82 | 37 | Irgacure 2959 (0.25% in DI) | 39 (40) | 30 |
| poly(SZNB-b-NPF6)-1, (diblock) | 82 | 37 | Irgacure 819 (0.1% MeOH/DI) | 39 | 25 (30) |
| poly(SZNB), (homopol.) | 99 | 33 | Irgacure 2959 (0.25% in DI) | 33 | 30 |
| poly(SZNB), (homopol.) | 99 | 33 | Irgacure 819 (0.1% MeOH/DI) | 33 | 25 (30) |
| poly(SZNB-b-NPF6)-2, (diblock) | 76 | 40 | Irgacure 2959 (0.25% in DI) | 47 | 30 |
| poly(SZNB-b-NPF6)-2, (diblock) | 76 | 40 | Irgacure 819 (0.1% MeOH/DI) | 47 | 30 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite hydrophilic porous membrane comprising a porous fluoropolymer support and a coating comprising a copolymer, wherein the copolymer comprises repeat units A and B, wherein A is of the formula:

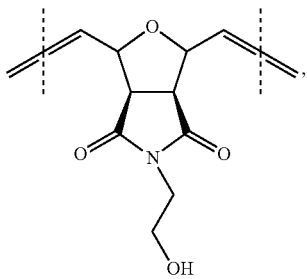

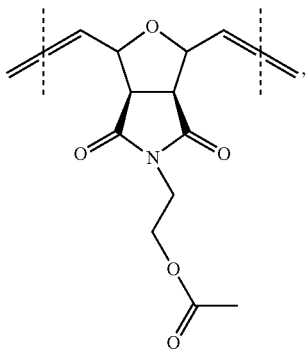

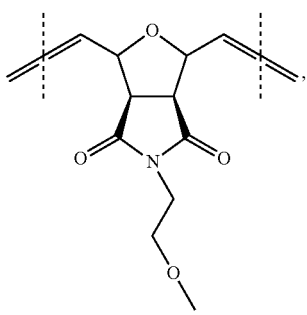

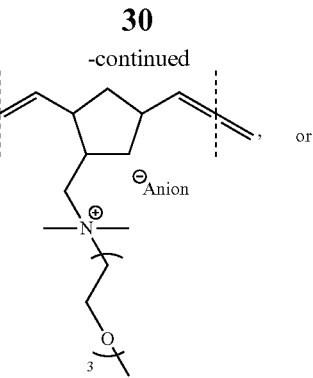

and B is of the formula

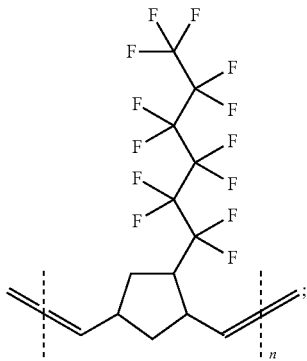

wherein:
the copolymer is a block copolymer or a random copolymer;
m and n, the number of repeat units A and B present in the copolymer, range from 1 to about 1000, provided the sum of n and m is equal to or greater than 10,
wherein the copolymer is optionally crosslinked.

2. The composite hydrophilic porous membrane of claim 1, wherein the copolymer has chain end groups selected from aryl groups and alkoxy groups.

3. The composite hydrophilic porous membrane of claim 1, wherein the copolymer is of one of the following formulae:

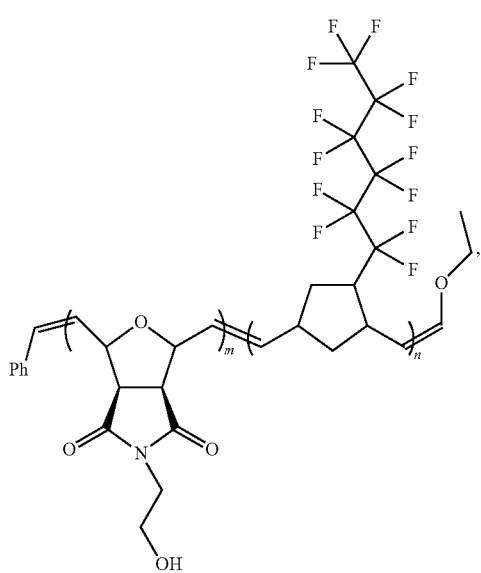
Poly(iM6-b-NPF6)
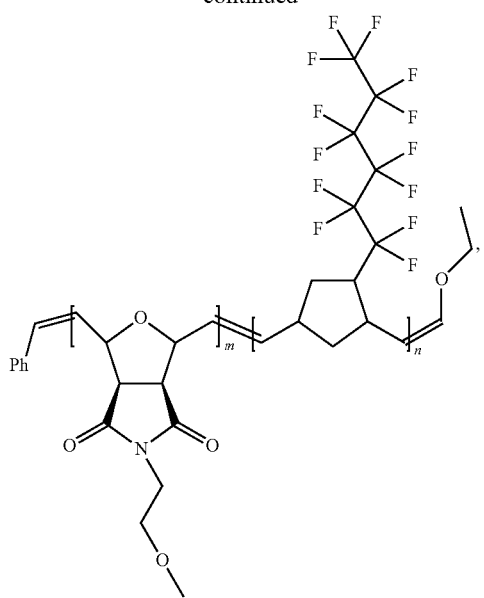
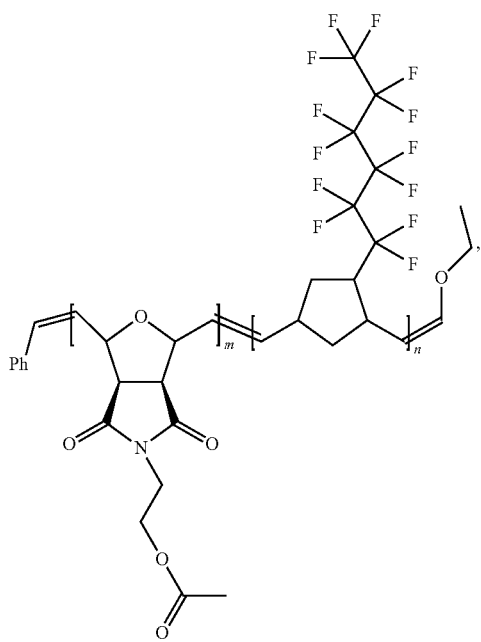
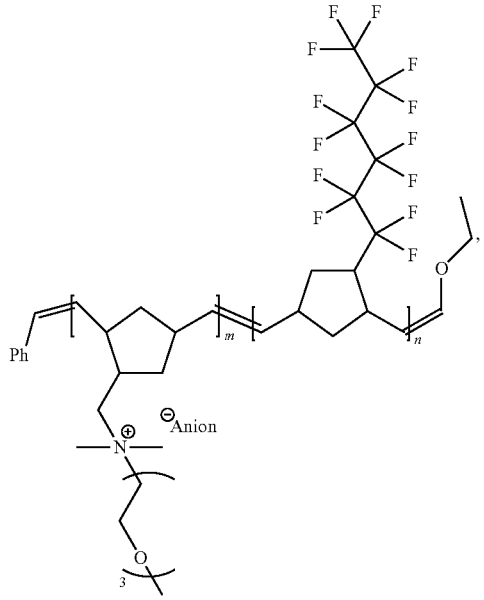

33
-continued
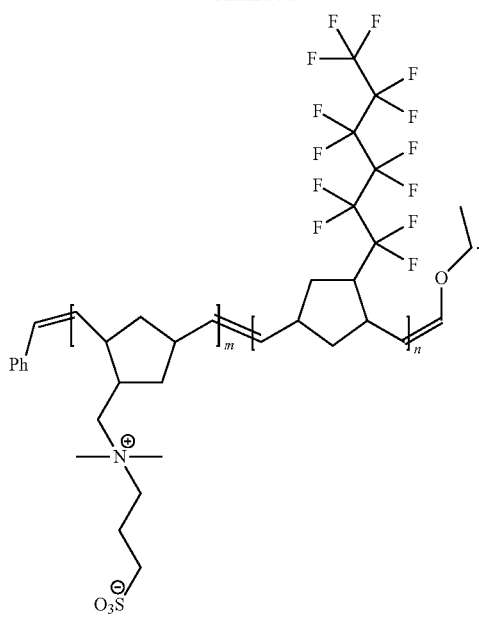
4. The composite hydrophilic porous membrane of claim 3, wherein the copolymer is of one of the following formulae:
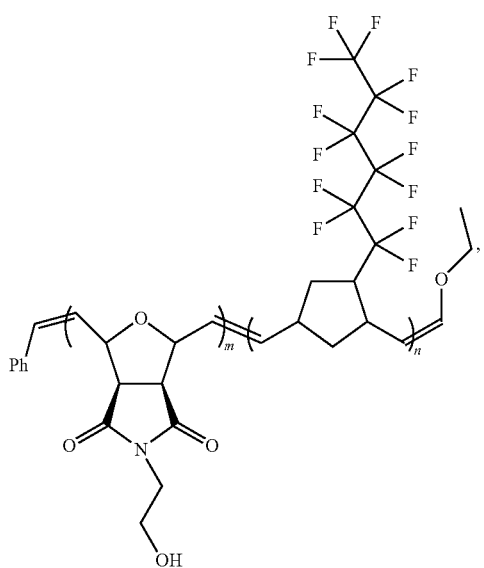
Poly(iM6-b-NPF6)
34
-continued
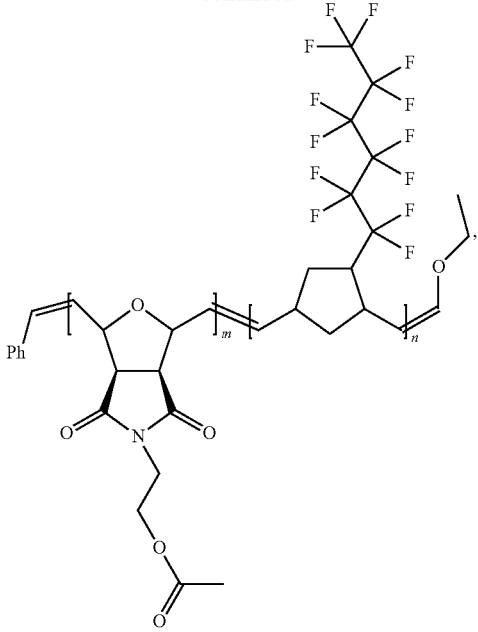
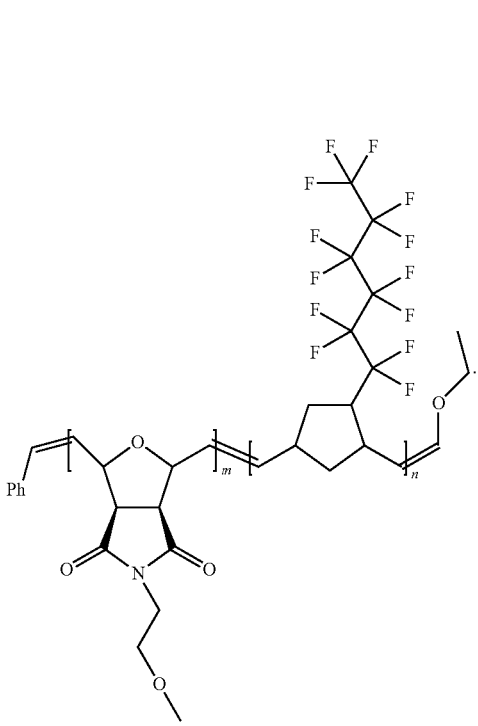
5. The composite hydrophilic porous membrane of claim 3, wherein the copolymer is of one of the following formulae:

35
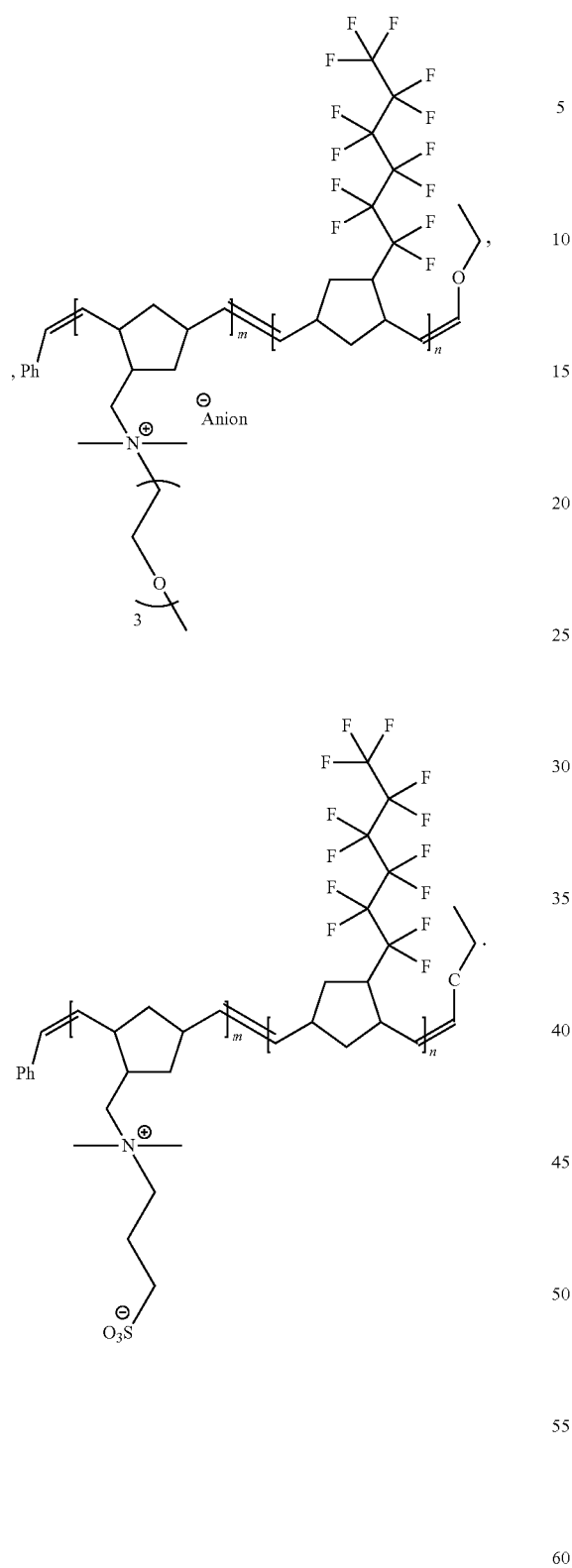
36
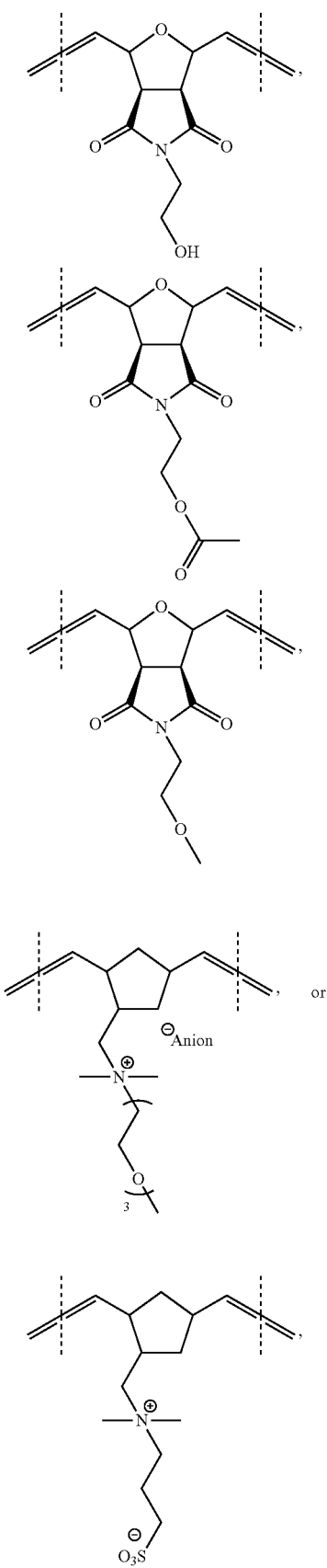
6. A method of hydrophilically modifying a porous fluoropolymer support comprising:
(i) providing a porous fluoropolymer support;
(ii) coating the porous fluoropolymer support with a solution comprising a solvent and a copolymer, wherein the copolymer comprises repeat units A and B, wherein A is of the formula:

and B is of the formula

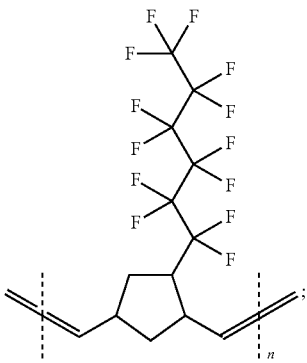

wherein:

the copolymer is a block copolymer or a random copolymer;

m and n, the number of repeat units A and B present in the copolymer, range from 1 to about 1000, provided the sum of n and m is equal to or greater than 10;

(iii) drying the coated support from (ii) to remove at least some of the solvent from the solution comprising said copolymer; and optionally (iv) crosslinking said copolymer present in the coated support.

7. The method of claim 6, wherein the copolymer has chain end groups selected from aryl groups and alkoxy groups.

8. The method of claim 6, wherein the copolymer is of one of the following formulae:

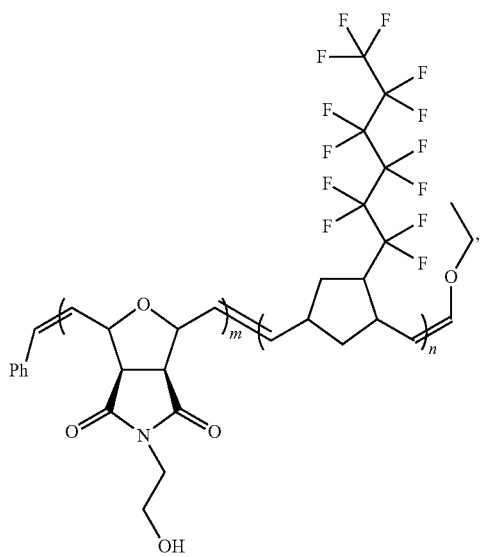

Poly(iM6-b-NPF6)

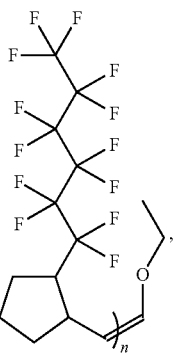

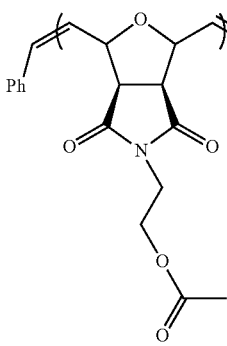

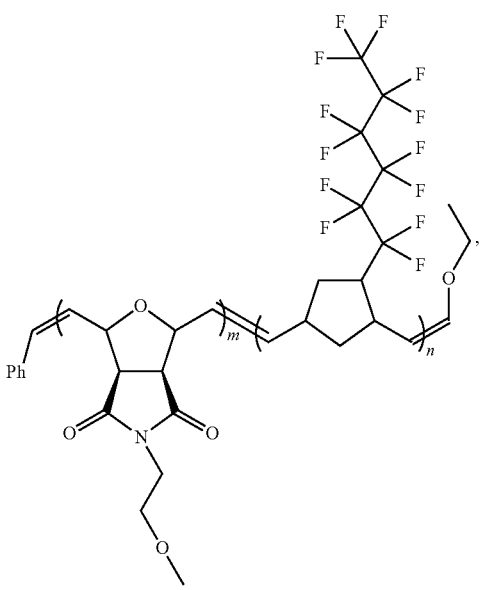

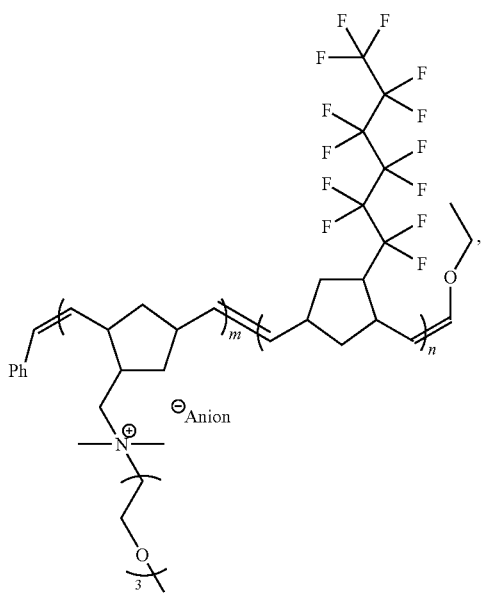

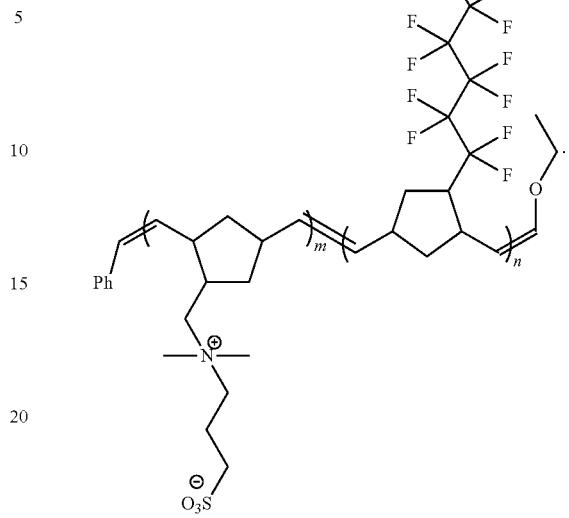

9. A hydrophilically modified porous fluoropolymer membrane produced by the method of claim 6.

10. The composite hydrophilic porous membrane of claim 1, wherein the porous fluoropolymer support is selected from PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

11. The composite hydrophilic porous membrane of claim 1, which is configured in a planar, flat sheet, pleated, tubular, spiral, or hollow fiber configuration.

* * * * *